UNITED STATES PATENT OFFICE.

EUGENE C. MAY, OF CHICAGO, ILLINOIS, ASSIGNOR TO NATIONAL GARBAGE FUEL COMPANY, OF CHICAGO, ILLINOIS.

ARTIFICIAL FUEL.

No. 807,629.     Specification of Letters Patent.     Patented Dec. 19, 1905.

Application filed February 17, 1905. Serial No. 246,159.

*To all whom it may concern:*

Be it known that I, EUGENE C. MAY, a citizen of the United States, residing at Chicago, in the county of Cook and State of Illinois, have invented certain new and useful Improvements in Artificial Fuels, of which the following is a specification.

My invention relates to improvements in artificial fuels made from garbage or other material, and has to do more particularly with the provision of an improved combustible agency the ingredients of which not only add greatly to the caloric value of the fuel, but also serve to materially reduce the cost of producing the same.

The herein-disclosed invention is an improvement upon my invention covered by United States Letters Patent dated June 30, 1903, and bearing No. 732,574, and the steps of the process therein described for treating garbage and the other constituent ingredients of the fuel are desirably used in connection with my improved fuel, although it will be understood that the invention herein disclosed is useful in the capacity outlined independently of the patented process. However, in describing my present invention I will fully outline the preferable steps used when the fuel is made from garbage.

It is well known that the vegetable oils and fatty matter which make up a large percentage of the constituent parts of garbage if properly treated possess caloric properties of great value. These valuable substances, which because of their mixture with putrid matter are rendered unfit for use in food products, are by my improved process preserved and fully utilized in the form of a fuel after the non-inflammable and foreign substances— such as tin cans, glass, &c.—have been eliminated. In order to render the assorted garbage highly inflammable and give it a sustained efficiency as a fuel, it is combined with a combustible agency, such as crude waste olive-oil or the like, and subjected to the action of a powerful disinfectant, having first been subdivided and exposed to a heat application of the desired temperature. Heretofore the quantity of oil added to the raw garbage has very materially increased the cost of producing the fuel without correspondingly increasing the caloric properties thereof. The oil, while giving the fuel a relatively sustained efficiency, does not impart to it such a high caloric value as is required and obtained from the natural fuels.

One object of the present invention is to reduce the cost of producing the fuel and increase its caloric value by using less oil than formerly and substituting a chemical which forms under the heat of the fire-box a combination or intimate union of a high caloric value. It will therefore be seen that I not only preserve the sustained efficiency due to the presence of the oil, but by reason of the highly-inflammable character of the chemical combination produced I insure instant ignition and greatly increase the caloric value of the fuel, thereby securing rapid and complete combustion. The addition of the proposed chemical not only enables me to secure results equal to natural fuels, but permits the use of a much cheaper grade of oil. When artificial fuel is composed of constituent ingredients most of which are not naturally of a highly-combustible nature, the value of an intense heat in the process of combustion is a feature of great importance, inasmuch as it insures a reduction of the fuel to a fine soft ash free from dirt and unburned matter.

My invention therefore consists in the use of a combustible agency for artificial fuel composed of crude olive or waste oil and hydrochloric acid.

The following steps preferably constitute the treatment to which the garbage is subjected in order to put it in condition to be combined with the combustible agent which constitutes the novel feature of this invention. The raw garbage is first distributed in a relatively thin layer upon a flat surface or picking-table, whereon it is assorted and there is removed all foreign and non-inflammable substances, such as glass, tin cans, and the like. The garbage is then passed through a crusher, wherein the lumps and hard or brittle matter are reduced or subdivided, resulting in the discharge of the garbage in a fine and pulpy condition, the garbage being usually moist or damp when collected. In order to render the garbage odorless and prevent the infection of the atmosphere with diseased germs when the fuel is burning, I subject it to the action of a disinfectant. The moisture is then eliminated from the garbage by evaporation, thereby rendering the residual mixture substantially dry and odorless. At this point the mixture is deposited in a suitable mixing apparatus and is combined with my improved combustible agent, which consists of hydrochloric acid and a suitable oil combined in proportions of oil about three per cent. and hydrochloric acid about one-half per cent. The material is now in a condition to be used as a fuel, if desired; but I prefer for convenience in shipment and handling to subject it to compression and mold it into briquets of prescribed shapes, and to this end I prefer to add to the fuel a suitable binding agent, so that the briquets will retain their form.

Combustible agents for artificial fuel have heretofore been combined with chemicals such as carbolic and sulfuric acid in order to increase the caloric properties of the fuel; but the presence in the combustion-chamber of chemicals above named is always accompanied by bad results. The residue of either of the above-named acids readily attacks the grate-bars, fire-brick, and soon renders them unfit for service, thereby necessitating frequent renewal of parts. In the employment of hydrochloric acid there can be no residue, for the reason that it is a liquid gas, and in the process of combustion it is entirely consumed. Therefore if the material from which the fuel has been prepared happens to be unsuitable or if it is improperly combined and complete combustion has not taken place the ash or clinkers cannot possibly retain even the smallest particle of acid. Further, when sulfuric, carbolic, and other acids are combined with oil an action takes place resulting in the chemical affinity of the molecules of the acid with those of the oil, resulting in a very distinct and material loss of heat units. As this loss takes place before the combustible agent is combined with the garbage, the result is a very material decrease in the efficiency of the fuel. When hydrochloric acid is combined with an oil, there is merely a physical, not a chemical, union, and the heat units of both oil and acid are held intact and fully retained until the fuel is introduced into the fire-box, and since the acid in this condition is a foe to ignition the artificial fuel while in storage is protected from spontaneous combustion; but when the fuel is introduced into the flaming fire-box the hydrochloric acid under the influence of incalescence enters an intimate union or chemical combination with the oil with evolution of heat, the vapors given off causing intense combustion.

While I have described hydrochloric acid used in connection with an artificial fuel produced from garbage, I do not wish to limit myself to this particular combination, as the said acid would be of great value used in any kind of artificial fuel.

Having thus described my invention, what I claim, and desire to secure by Letters Patent, is—

1. In artificial fuel, the combination with the stock made from garbage, of an agent consisting of oil and hydrochloric acid intermingled with said stock and which promotes combustion when exposed to the heat of the furnace.

2. In artificial fuel, the combination with the stock made from prepared garbage, of an agent consisting of oil and hydrochloric acid combined in proportions of about three per cent. oil and one-half per cent. acid and commingled with said stock, for the purpose set forth.

In testimony whereof I have signed my name to this specification, in the presence of two subscribing witnesses, this 14th day of February, 1905.

EUGENE C. MAY.

Witnesses:
CARL H. CRAWFORD,
HERMAN C. HOFF.